Figure 1:
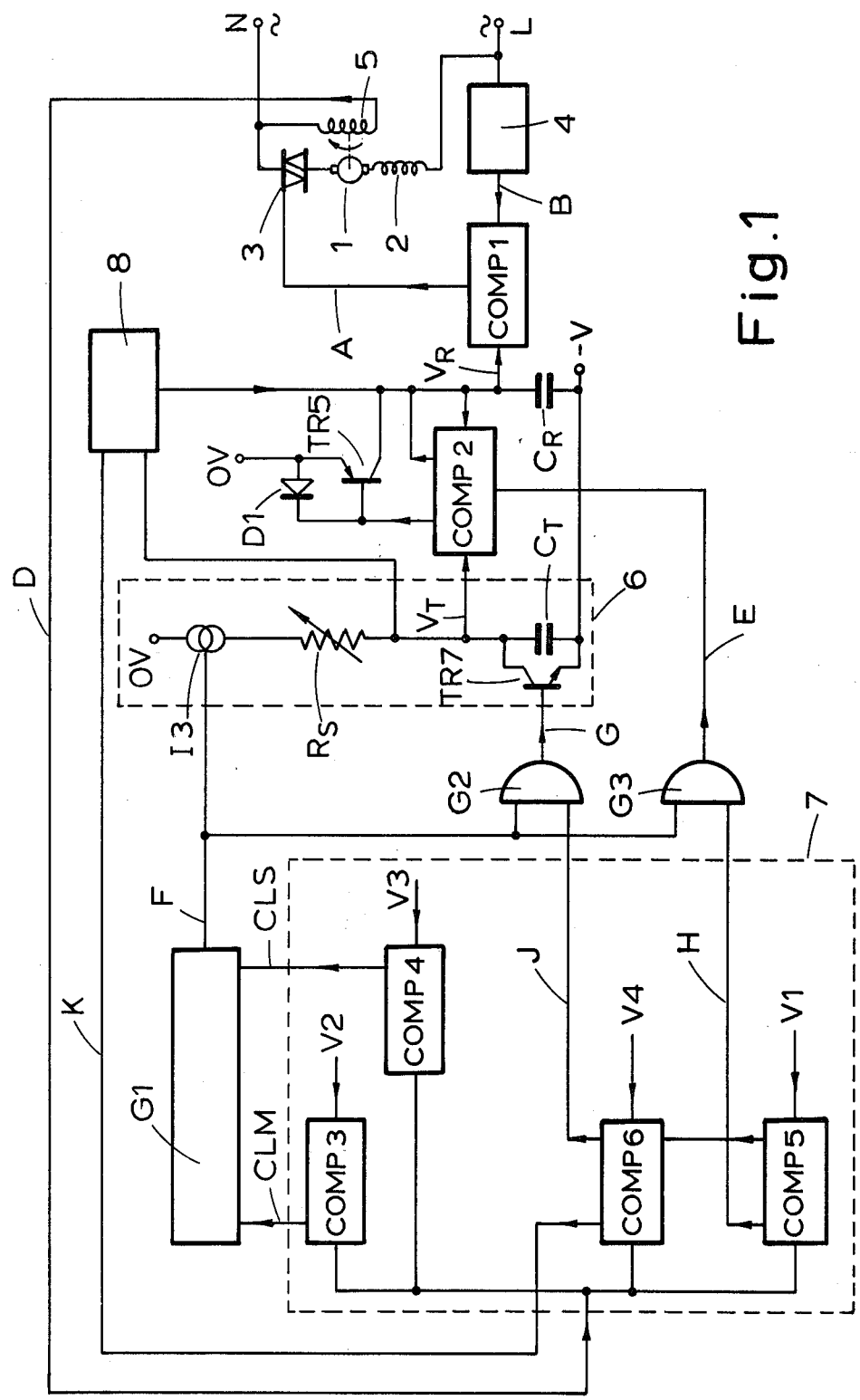

United States Patent [19]

Armstrong

[11] 4,117,384
[45] Sep. 26, 1978

[54] TACHOGENERATOR PROCESSING CIRCUITS AND MOTOR SPEED CONTROL SYSTEMS INCLUDING SUCH CIRCUITS

[75] Inventor: Desmond R. Armstrong, Wallington, England

[73] Assignee: U.S. Philips Corporation, New York, N.Y.

[21] Appl. No.: 790,700

[22] Filed: Apr. 25, 1977

[30] Foreign Application Priority Data

Apr. 27, 1976 [GB] United Kingdom ............... 17014/76

[51] Int. Cl.² ........................................... H02P 1/04
[52] U.S. Cl. .................................... 318/326; 318/398
[58] Field of Search ................ 318/326, 327, 328, 398

[56] References Cited

U.S. PATENT DOCUMENTS 3,586,946  6/1971  Sadashige ............................ 318/326

*Primary Examiner*—David Smith, Jr.

*Attorney, Agent, or Firm*—Frank R. Trifari; Bernard Franzblau

[57] ABSTRACT

A circuit for processing the a.c. output of a tachogenerator whose frequency is proportional to the speed of a rotor of the tachogenerator, said circuit including voltage level detection means responsive to said a.c. output, key pulse producing means responsive to at least one output of the detection means to produce a key pulse whose duration is inversely proportional to the rotational speed, first gating means responsive to an output of the detection means and an output of the key pulse producing means to produce a reset pulse after a predetermined period in the interval between each key pulse, and a voltage generator responsive to each reset pulse to provide a predetermined output level and responsive to each key pulse to ramp that output level at a predetermined rate for the duration of that key pulse, whereby the output level of the voltage generator during each said predetermined period is a predetermined function of the rotational speed.

13 Claims, 11 Drawing Figures

TACHOGENERATOR PROCESSING CIRCUITS AND MOTOR SPEED CONTROL SYSTEMS INCLUDING SUCH CIRCUITS

This invention relates to circuits for processing the a.c. output signal of a tachogenerator whose frequency is proportional to the speed of a rotor of the tachogenerator. The invention also relates to motor speed control systems including such circuits, for example for use in domestic washing machines.

Tachogenerators generate an a.c. output signal whose amplitude is dependent on and whose frequency is proportional to the speed of a rotor of the tachogenerator. Circuits are known in which the tachogenerator output is rectified and smoothed to give a d.c. output which is a function of the tachogenerator output amplitude.

An object of this invention is to provide a circuit in which a voltage is generated which is a function of the tachogenerator output frequency but is essentially not dependent on the tachogenerator output amplitude.

According to the invention there is provided a circuit for processing the a.c. output signal of a tachogenerator whose frequency is proportional to the speed of a rotor of the tachogenerator, said circuit including voltage level detection means responsive to said a.c. output, key pulse producing means responsive to at least one output of the detection means to produce a key pulse whose duration is inversely proportional to the rotational speed, first gating means responsive to an output of the detection means and to an output of the key pulse producing means to produce a reset pulse after a predetermined period in the interval between each key pulse, and a voltage generator responsive to each reset pulse to provide a predetermined output level and responsive to each key pulse to ramp that output level at a predetermined rate for the duration of that key pulse, whereby the output level of the voltage generator during each said predetermined period is a predetermined function of the rotational speed.

According to a preferred embodiment of the invention the detection means is responsive to first and second voltage levels of said a.c. signal of opposite polarity to provide corresponding first and second outputs, and the key pulse producing means is a JK flip-flop comprising a master bistable circuit which is clocked by said first output of the detection means and a slave bistable circuit which is clocked by said second output of the detection means.

The advantage of the above preferred embodiment is that a substantial degree of immunity is provided from noise on the tachogenerator output signal which does not cross both the first and second voltage levels.

Circuits are known for controlling the speed of an electric motor when the motor is coupled to a tachogenerator which provides an a.c. output signal whose frequency is proportional to the rotational speed, said circuits including a controlled solid state switch for connection in series with the motor such that power is supplied as a pulse to the motor while the switch is turned on, means to provide a reference voltage, the proportion of time for which the switch is turned on being dependent on said reference voltage, and feedback means which are adapted to modify said reference voltage according to the output of the tachogenerator.

According to a further preferred embodiment of the invention a circuit as described above according to the invention for processing the a.c. output of a tachogenerator is included in the feedback means of a circuit for controlling the speed of an electric motor as just described, and the feedback means is furthermore adapted to modify said reference voltage according to the output level of the voltage generator during each said predetermined period.

The substantial independance of the output level of the voltage generator of the tachogenerator processing circuit from the amplitude of the tachogenerator output signal and the buffering which the tachogenerator circuit provides is particularly advantageous in a motor speed control system, for example use us in domestic washing machines, since it enables very accurate feedback information to be provided from a comparatively simple and therefore inexpensive tachogenerator.

According to another feature of a motor speed control circuit according to the invention, second gating means are provided responsive to an output of the detection means and an output of the key pulse producing means to produce a said predetermined pulse during each sample period. The means to provide a reference voltage is a capacitor, and means are provided responsive to each sample pulse to make a comparison of the output level of the voltage generator with the reference voltage and responsive to a difference between the compared voltages to provide a current of appropriate sense to the capacitor to modify the reference voltage.

An advantage of this feature is that it can be arranged that the reference voltage is only changed at most by a small amount as a result of each comparison, so that there is only a small effect on the feedback system of a spurious output level of the voltage generator in any one predetermined period.

According to a further feature of a motor speed control circuit according to the invention, said voltage generator includes a capacitor which is charged for the duration of each key pulse by a current having a value corresponding to said predetermined rate, and motor speed selection means includes means to determine the value of the charging current during each key pulse.

An advantage of this feature is that the motor speed can be varied over a wide range, for example 20 : 1 in a washing machine, by varying this charging current along, e.g. by means of a single variable resistance.

Figure 2:
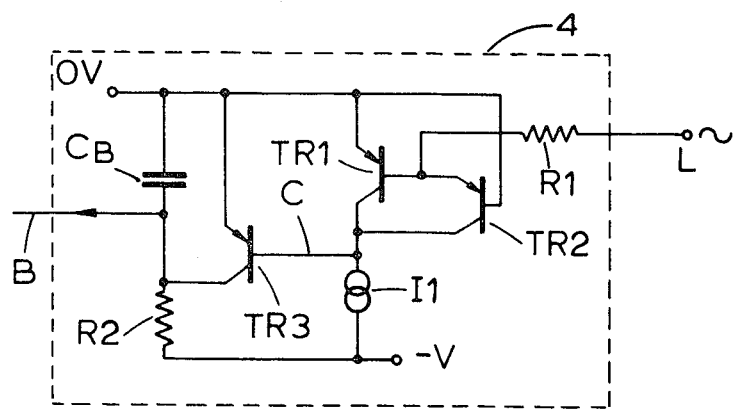
Figure 3:
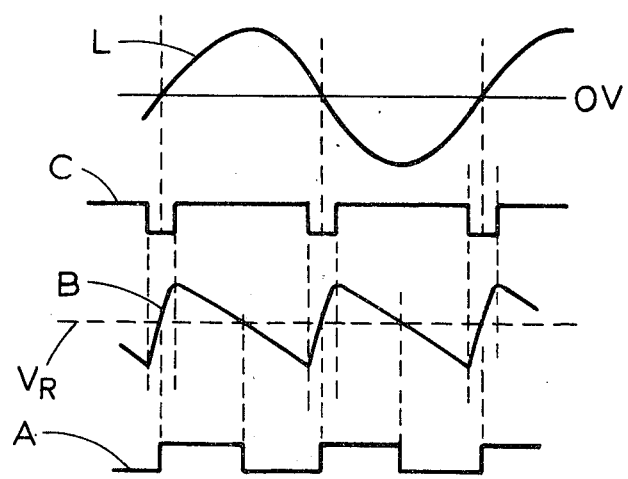
Figure 4:
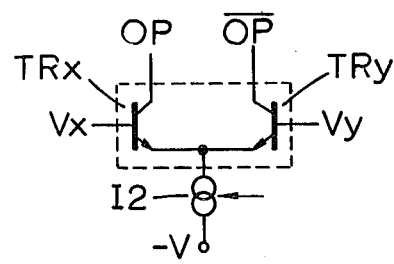
Figures 5A, 5B:
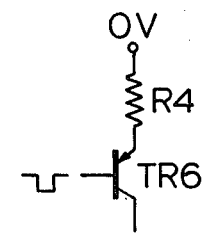
Figure 7:
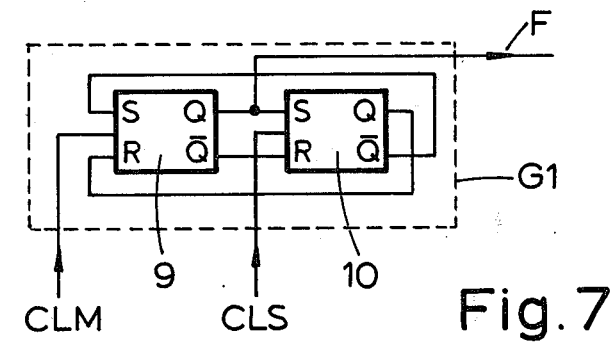
Figure 9:
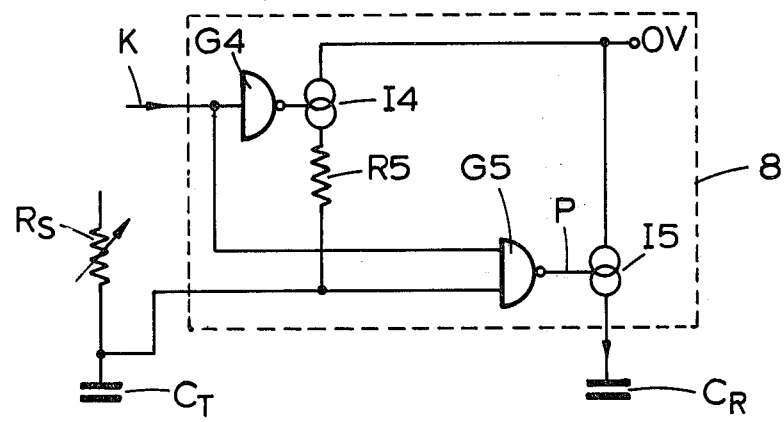
Figure 8:
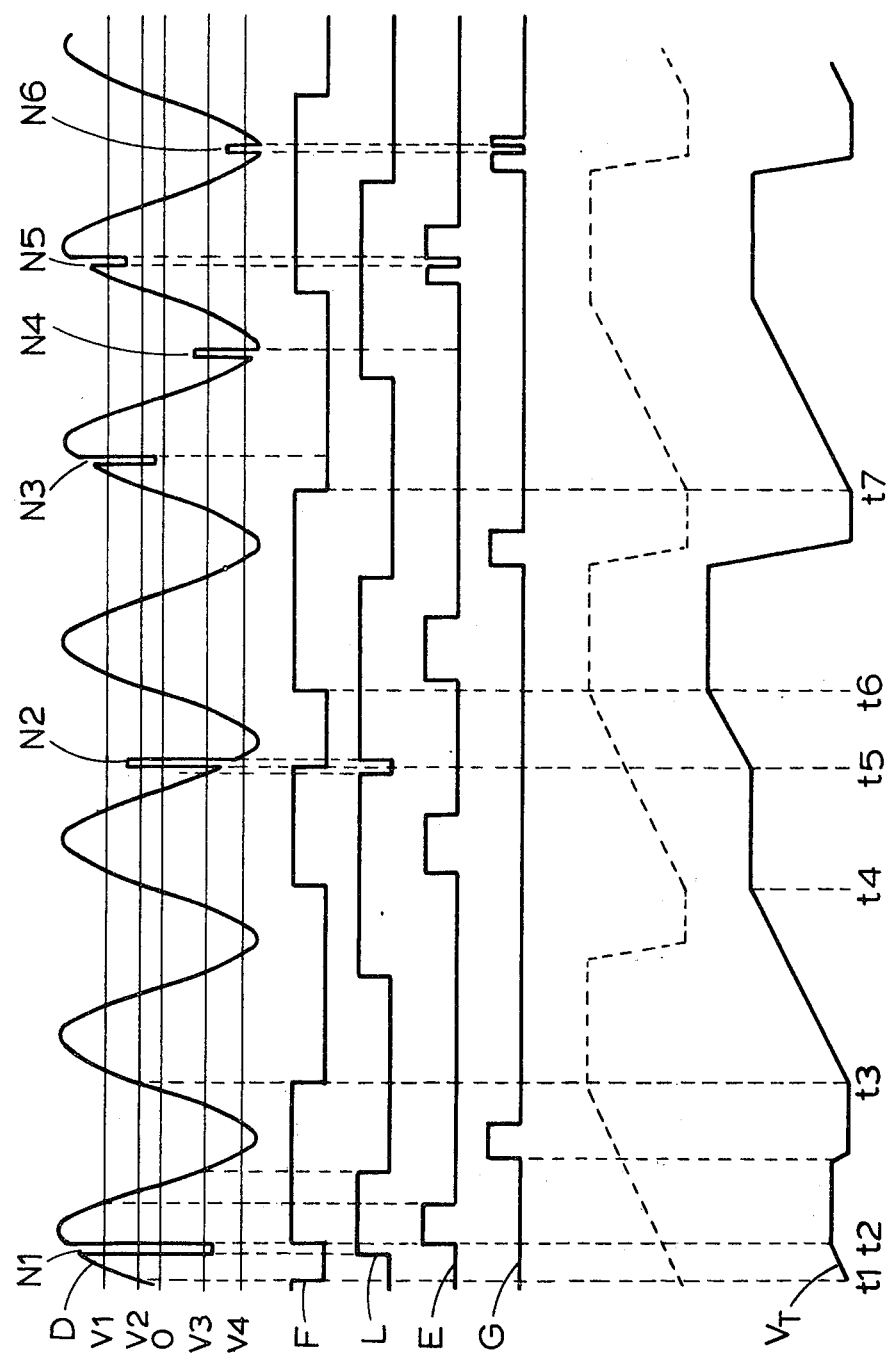
Figure 10:
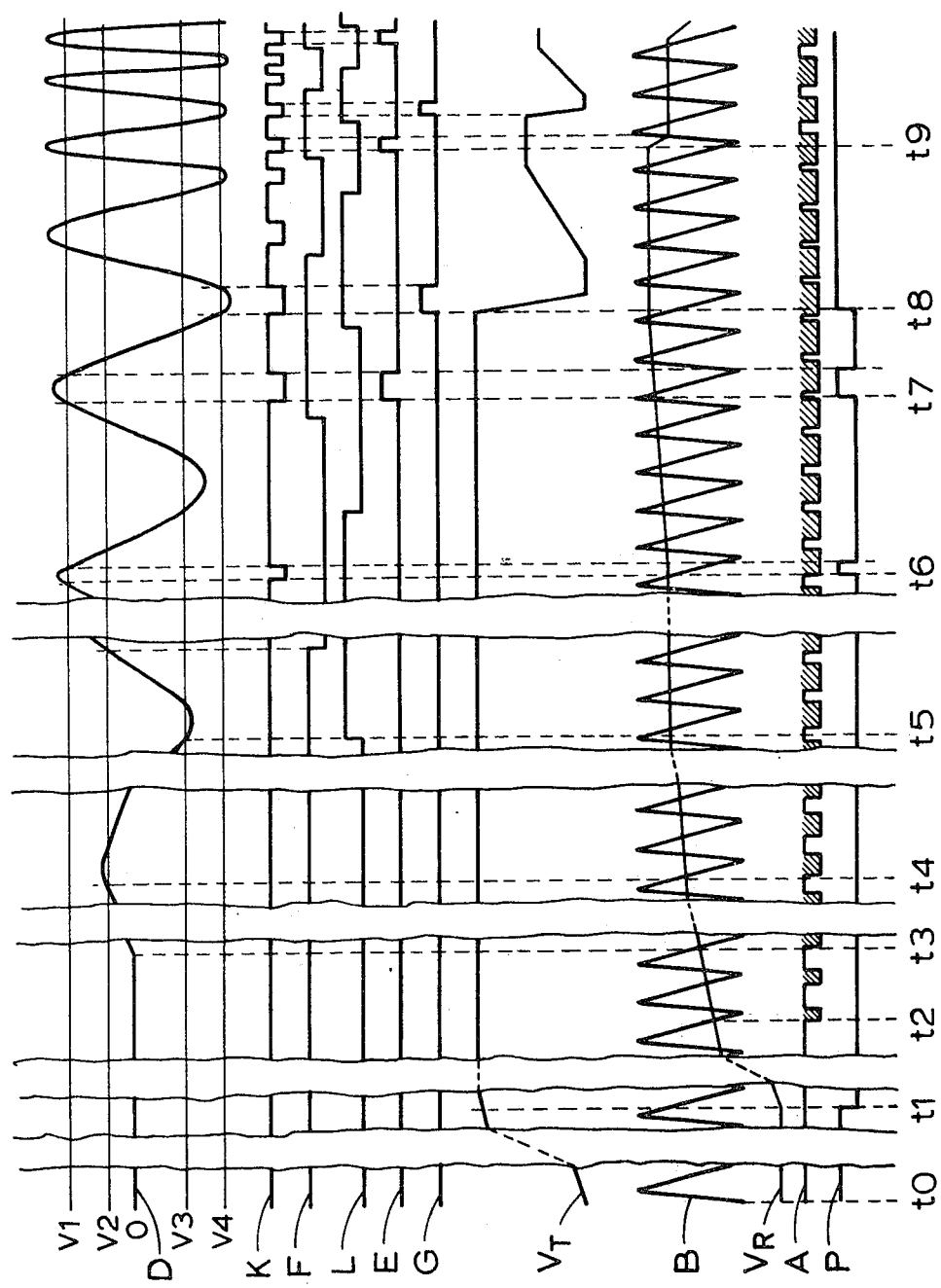

An embodiment of the invention will now be described with reference to the accompanying drawings, in which:

FIG. 1 shows a mainly schematic circuit diagram of a tachogenerator signal processing circuit according to the invention incorporated in a motor speed control circuit according to the invention, FIG. 2 shows the details of a ramp generator circuit which is part of the circuit of FIG. 1, FIG. 3 shows voltage waveforms associated with FIGS. 1 and 2, FIG. 4 shows the details of each of the voltage comparators shown in FIG. 1, FIGS. 5A and 5B show the details of current sources shown in FIGS. 1, 2, and 4, FIG. 6 shows voltage waveforms of the circuit of FIG. 1 operating at steady speed, FIG. 7 shows the details of a key pulse producing means which is a part of the circuit of FIG. 1, FIG. 8 shows voltage waveforms illustrating the effect of noise pulses on the circuit of FIG. 1, FIG. 9 shows the detail of a start-up circuit which is part of the circuit of FIG. 1, and FIG. 10 shows voltage waveforms illustrating start-up of the circuit of FIG. 1.

Referring now to FIG. 1, an electric motor has an armature 1 and a field winding 2 both connected in series with a triac 3 between the line terminal L and the neutral terminal N of an A.C. mains power supply. In operation, power is supplied as a pulse to the motor during each half cycle of the supply each power pulse commencing when the triac 3 is turned on by application to its gate electrode of a voltage of appropriate level in an output signal A supplied from a voltage comparator COMP1. The voltage comparator COMP1 provides this appropriate level of the signal A when the voltage of the output signal B of a ramp waveform generator 4 goes below a reference voltage $V_R$ which is the voltage stored on a reference capacitor $C_R$. Under steady conditions the reference voltage $V_R$ is constant at a value appropriate to a desired speed of the motor.

Referring to FIGS. 2 and 3, the ramp waveform generator 4 and its operation are shown in detail. The alternating voltage on the line terminal L of the A.C. power supply is applied via a suitable voltage dropping resistor R1 to the base and emitter respectively of two transistors TR1 and TR2. The emitter and base respectively of the transistors TR1 and TR2 are connected to a positive voltage rail OV which is also the voltage of the neutral terminal of the A.C. power supply, and the collectors of both transistors TR1 and TR2 are connected via a current source I1 to a negative voltage rail −V. The collectors of the transistors TR1 and TR2 are also connected to the base of a transistor TR3 whose emitter is connected to the positive voltage rail OV and whose collector is connected via a resistor R2 to the negative voltage rail −V. A capacitor $C_B$ is connected between the positive voltage rail OV and the collector of the transistor TR3.

When the A.C. supply voltage L is low, that is to say close to OV, then the transistors TR1 and TR2 both do not conduct and so the current source I1 can switch on the transistor TR3. The periods during which the transistor TR3 is switched on are shown by the lower level portions of the pulse voltage waveform C; and during these periods the transistor TR3 discharges the capacitor $C_B$ towards the positive rail OV which is shown by the rising portion of the ramp voltage waveform B. During each half cycle of the A.C. supply when the voltage at the terminal L is sufficiently positive or sufficiently negative, then the transistor TR2 or the transistor TR1 respectively will conduct and the transistor TR3 will be switched off. The capacitor $C_B$ will during this time charge via the resistor R2 towards the negative voltage rail −V which is shown by the falling portion of the ramp voltage waveform B.

The voltage comparator COMP1 shown in FIG. 1 which compares the reference voltage $V_R$ and the ramp voltage waveform B may be realised as shown in FIG. 4 as a long tailed pair of transistors TRx and TRy. The transistors TRx and TRy are operative to compare the voltages Vx and Vy applied to their respective bases ($V_R$ and B in the case of COMP1) when a current source I2 connected between the two emitters and a negative voltage rail −V is gated on. The current source I2 may be realised as shown in FIG. 5A as a transistor TR4 connected via a resistor R3 to the negative voltage rail −V and it is therefore gated on when a sufficiently positive voltage is applied to its base. Referring back to FIG. 4, when the voltage Vx is greater than the voltage Vy the transistor TRx conducts and the transistor TRy does not conduct, and vice versa. The conducting and non-conducting conditions of the transistors TRx and TRy can be applied by the respective outputs OP and OP of the voltage comparator as the presence or absence of currents or, via suitable resistances, as voltages of high or low value. In FIG. 1 the voltage comparator COMP1 is shown as having only one output, since only one output is used to provide the voltage output signal A, and no gate is shown because this voltage comparator is arranged to be permanently gated on.

Referring not to FIGS. 1 and 3, the triac 3 is turned on during each half cycle of the A.C. supply when the voltage waveform A ouput of the comparator COMP1 is at its lower level in response to the voltage of the ramp waveform B being below the reference voltage $V_R$. If the reference voltage $v_R$ is high then the voltage of the ramp waveform B goes below the reference voltage $V_R$ and the lower level of the waveform A commences early in each half cycle of the A.C. supply where a large amount of power is supplied to the motor to keep it rotating at a high speed corresponding to the high reference voltage $V_R$. The value of the reference voltage $V_R$ is selected, and modified under non-steady conditions by a feedback arrangement including a tachogenerator 5 coupled to the motor the tachogenerator providing an a.c. output waveform D whose frequency is proportional to the rotational speed.

Referring to FIG. 1, the feedback arrangement is responsive to the output waveform D of the tachogenerator 5 to provide a voltage $V_T$ which is compared with the reference voltage $V_R$ in a voltage comparator COMP2 when that comparator is gated on by a sample pulse voltage waveform E in alternate periods of the a.c. output waveform D. The voltage comparator COMP2 may be realised in the form already described with reference to FIGS. 4 and 5A. A diode D1 and a transistor TR5 have their anode and emitter respectively connected to the positive voltage rail OV, and their cathode and base respectively connected to one of the outputs of the comparator COMP2. The collector of the transistor TR5 is connected to one side of the reference capacitor $C_R$ the other side of which is connected to the negative voltage rail −V. The diode D1 and transistor TR5 form a current mirror such that, if the voltage $V_T$ is greater than the reference voltage $V_R$ on the capacitor $C_R$ when the comparator COMP2 is gated on, then current which flows into the output of the comparator COMP2 which is connected to the current mirror turns of the transistor TR5 which provides a charging current to the capacitor $C_R$ to increase the voltage $V_R$. If the voltage $V_T$ is less than the reference voltage $V_R$ when the comparator COMP2 is gated on, then current flows into the other output of the comparator COMP2 which is connected to the capacitor $C_R$ so as to provide discharging current to the capacitor $C_R$ to decrease the voltage $V_R$. If the voltages $V_T$ and $V_R$ are equal when the comparator COMP2 is gated on then equal currents flow into both outputs of the comparator COMP2 and the reference capacitor $C_R$ is neither charged nor discharged.

The voltage $V_T$ provided to the comparator COMP2 is the output of a voltage generator 6 and is the voltage on one side of a ramp capacitor $C_T$ having the other side connected to the negative voltage rail −V. The one side of the ramp capacitor $C_T$ is also connected via a variable resistor $R_S$ and a gated current source I3 to the positive voltage rail OV. The current source I3 may be realised as shown in FIG. 5B as a transistor TR6 connected via a resistor R4 to the positive voltage rail OV and it is therefore gated on when a sufficiently negative voltage is applied to its base. Voltage level detection means 7 are responsive to the tachogenerator a.c. output waveform D to provide clock outputs CLM and CLS to a key pulse producing means G1 (to be described in detail later) whose pulse output voltage waveform F is used to gate the current generator I3 and is also applied as one of two inputs to an AND gate G2 to and an AND gate G3. The other inputs to the AND gates G2 and G3 are supplied from the voltage level detection means 7.

Figure 6:
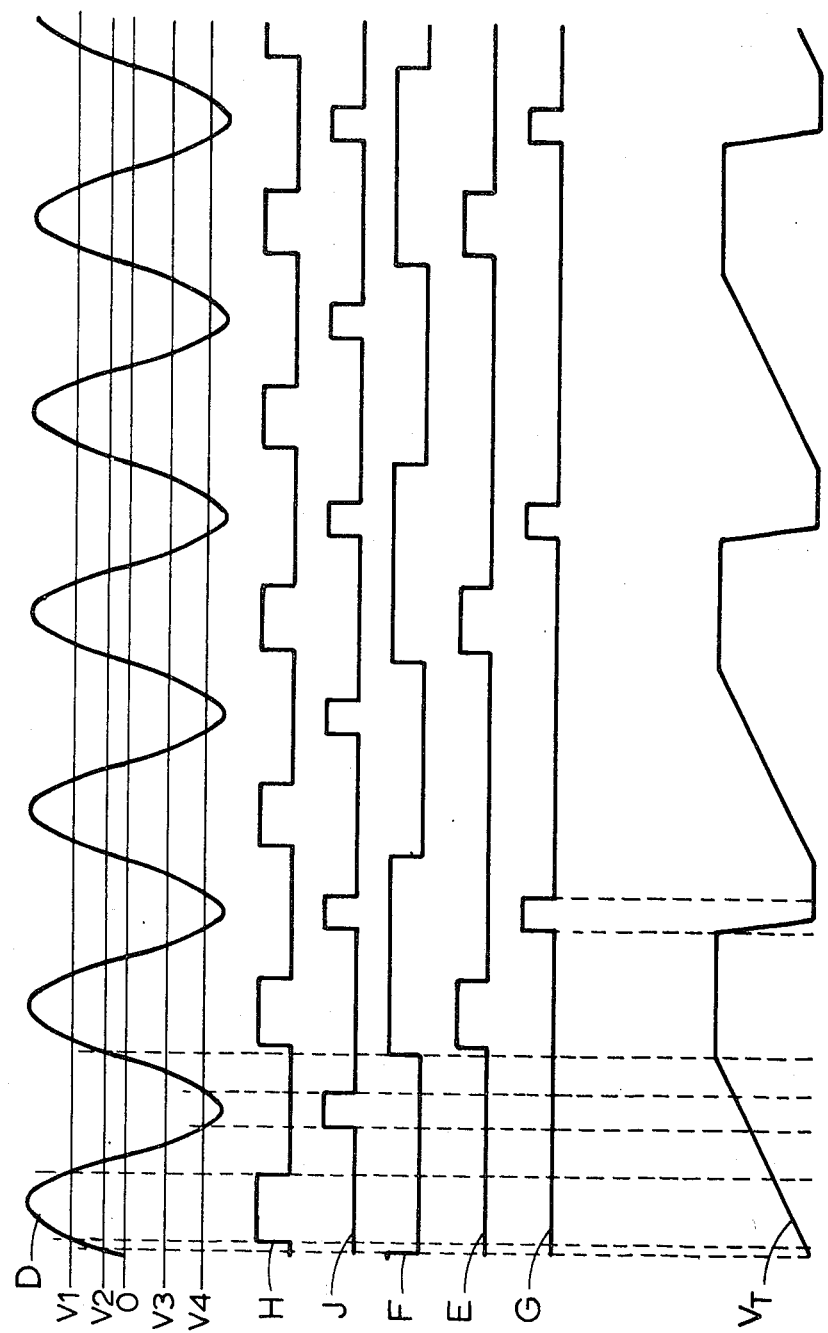

As can be seen in FIG. 6, the pulse voltage waveform F is at a low voltage level for alternate whole periods of the tachogenerator waveform D. During each low level period of the voltage waveform F, the current source I3 is gated on and a charging current whose value is determined by the variable resistor $R_S$ is provided to the ramp capacitor $C_T$ to ramp the voltage $V_T$ in a positive direction from the negative voltage rail $-V$. Each low level period of the voltage waveform F may be termed a key pulse. In the interval between each key pulse the voltage $V_T$ is unchanged for a sample period during which the comparator COMP2 is gated on by the sample pulse waveform E provided by the AND gate G3. After the sample period, but still in the interval between each key pulse, a transistor TR7 connected across the ramp capacitor $C_T$ in the voltage generator 6 is switched on by a reset pulse waveform G provided by the AND gate G2 and the ramp capacitor $C_T$ discharges to ramp the voltage $V_T$ in a negative direction back to the negative voltage rail $-V$.

The output level $V_T$ of the voltage generator 6 during each sample period is a predetermined function of the rotational speed of the tachogenerator 5 which is coupled to the motor armature 1. The rate of discharge of the ramp capacitor $C_T$ is arranged so that the voltage $V_T$ will come back to the negative voltage rail $-V$ during the shortest possible full reset period provided by the reset pulse waveform G from the most positive possible level of the voltage $V_T$. Thus the voltage $V_T$ starts from the same perdetermined level $-V$ at the beginning of each key pulse provided by the voltage waveform F. The value of the voltage $V_T$ which is reached at the end of each key pulse therefore depends on the duration of that key pulse and the slope of the ramp during that key pulse. The duration of each key pulse is one whole period of the tachogenerator waveform D and is therefore inversely proportional to the rotational speed. The slope of the ramp during each key pulse is determined by the value of the charging current supplied to the capacitor $C_T$ which itself is determined by the variable resistor $R_S$. The variable resistor $R_S$ thus constitutes motor speed selection means. For a given selected motor speed, the value of the resistor $R_S$ is chosen such that under steady conditions with the motor rotating at that selected speed, the capacitor $C_T$ will be charged during each key pulse at a rate determined by the value of the resistor $R_S$ for a time determined by the duration of the key pulse so that the value of the voltage $V_T$ reached at the end of the key pulse is a predetermined value corresponding to the given selected motor speed. Under steady conditions with the motor rotating at that selected speed the reference voltage $V_R$ on the capacitor $C_R$ will be the same as the voltage $V_T$, and the reference voltage $V_R$ will determine the amount of power supplied to the motor which is appropriate to rotate it at that selected speed.

If the motor is rotating at selected speed and then the load on the motor increases so as to decrease that speed, the feedback system will behave as follows. The decrease in speed will decrease the frequency of the output D of the tachogenerator 5 which will proportionally increase the duration of the key pulses in the waveform F derived from the output D. The increased duration of the positive ramp of the voltage $V_T$ during each key pulse will increase the value of $V_T$, which is gated to the comparator COMP2 during the succeeding sample period, above the value of $V_R$. The comparator COMP2 will act, as has been previously described, to raise the value of $V_R$. This will result in more power being supplied to the motor to raise its speed which will then decrease the value of $V_T$ until the system stabilises, after a plurality of rotations and corresponding adjustments by the comparator COMP2, with the motor back at its selected speed and the voltages $V_T$ and $V_R$ back at their corresponding predetermined equal values. A decrease in the load on the motor so as to increase the speed will result in the feedback system behaving in the inverse manner to that just described so as to also bring the motor back to its selected speed.

If the motor is rotating at a speed selected by the resistor $R_S$, a change to a new selected speed can be achieved by changing the value of the resistor $R_S$. The response of the system to a change in the value of the resistor $R_S$ will be apparent from the explanation of the system as described so far. Briefly, to increase the speed the value of $R_S$ is decreased which will increase the value of $V_T$ at the end of the key pulse (of duration corresponding to the initial speed) above the existing value of $V_R$ and moreover above the value of $V_T$ required for the new speed. The value of $V_R$ will thus be increased resulting in an increased speed giving a shorter duration key pulse with a decreased value of $V_T$, so that $V_T$ decreases and $V_R$ increases over a plurality of periods of rotation until they are both equal at the new predetermined higher value corresponding to the new higher selected speed.

If the motor is stationary, the capacitor $C_R$ will have a predetermined voltage $V_R$ at a value more negative than the most negative value reached by the ramp waveform B supplied by the ramp generator 4 from the AC supply. In this case, as will be seen from FIG. 3, no power will be supplied to the motor. A start-up circuit 8 is provided which is turned on under these conditions to raise the voltage $V_R$ until the motor turns and which is turned off when the system is operating normally. This will be explained in more detail later.

The voltage level detection means 7, the key pulse producing means G1 and their operation with the AND gates G2 and G3 will now be described in more detail. The tachogenerator output voltage waveform D is applied to four voltage comparators COMP3, COMP4, COMP5 and COMP6 where it is compared with four reference voltage levels V2, V3, V1 and V4 respectively. These four voltage comparators may each be realised as shown in FIG. 4 with resistors to give appropriate voltage level outputs. The voltage comparators COMP3, COMP4, and COMP5 are permanently gated on, but the voltage comparator COMP6 is only gated on when an appropriate output is given by the comparator COMP5. The four reference voltage levels V1, V2, V3 and V4 are shown in FIG. 6 relative to the voltage output waveform D of the tachogenerator 5.

The voltage waveform D is shown as alternating in polarity with respect to a zero voltage corresponding to the motor and hence the tachogenerator being at rest. The voltage levels V1 and V4 are of opposite polarity; and furthermore they are asymmetric with respect to the zero voltage level for reasons concerned with the start-up system as will be explained later. The reference voltage level of greatest magnitude, which is the negative polarity reference voltage level V4, is chosen to be considerably smaller than the smallest amplitude voltage which will be generated in practice by the tachogenerator at the lowest desired operating speed of the motor. In this way, the response of the voltage level detection means 7 is essentially not dependent on the tachogenerator output amplitude. The voltage levels V2 and V3 are of opposite polarity and are of magnitude less than that of the voltage levels V1 and V4 respectively.

The key pulse producing means G1 is shown in detail in FIG. 7. It consists of a master bistable circuit 9 and a slave bistable circuit 10. The conditions of the set input S and the reset input R of the master bistable circuit 9 are clocked through to its Q and $\overline{Q}$ outputs respectively by the leading edge of the output CLM of the comparator COMP3 when the tachogenerator voltage goes more positive than the reference voltage V2. The Q and $\overline{Q}$ outputs of the master bistable circuit 9 are connected respectively to the set input S and the reset input R of the slave bistable circuit 10. The conditions of the set input S and the reset input R of the slave bistable 10 are clocked through to its Q and $\overline{Q}$ outputs respectively by the leading edge of the output CLS of the comparator COMP4 when the tachogenerator voltage D goes more negative than the reference voltage V3. The Q and $\overline{Q}$ outputs of the slave bistable circuit 10 are cross-connected respectively to the reset input R and the set input S of the master bistable circuit 9. This cross-connection ensures that the master and slave bistable circuits 9 and 10 behave together as a JK flip-flop in response to either one of the clock inputs CLM or CLS. That is to say that the master bistable circuit 9 changes state in response to each clock input CLM, providing that a clock input CLS has changed the state of the slave bistable circuit 10 in the period since the previous clock input CLM; and vice versa. The Q or $\overline{Q}$ output of the master bistable circuit 9 of the slave bistable circuit 10 can be used as a divide-by-two output responsive to the tachogenerator output voltage waveform D. As shown in FIG. 7 the Q output of the master bistable circuit 10 is used to provide the pulse waveform F shown in FIG. 6, i.e. key pulses of low voltage to the voltage generator 6 shown in FIG. 1 and an enabling high voltage to the AND gates G2 and G3 in the intervals between the key pulses. The advantage of using the two clock inputs CLM and CLS responsive to the two opposite polarity voltage levels V2 and V3 is that a substantial degree of immunity is thereby provided from noise on the tachogenerator output which does not cross both the voltage levels V2 and V3, as will be explained in more detail later.

Referring now only to FIGS. 1 and 6, the voltage comparator COMP5 provides a pulse voltage waveform H from one of its outputs. The voltage waveform H gives a positive pulse when the tachogenerator output voltage waveform D is more positive than the reference voltage V1. Alternate positive pulses in the waveform H are gated through by the AND gate G3 as positive voltage pulses in the sample pulse waveform E by the more positive level of the voltage waveform F in the interval between each key pulse. The opposite phase output of the voltage comparator COMP5 gates on the voltage comparator COMP6 when the tachogenerator output voltage waveform D is less positive than the reference voltage V1. The voltage comparator COMP6 provides a pulse voltage waveform J from one of its outputs. The voltage waveform J gives a positive pulse when the tachogenerator output voltage waveform D is more negative than the reference voltage V4. Alternate positive pulses in the waveform J are gated through by the AND gate G2 as positive voltage pulses in the reset pulse waveform G by the more positive level of the voltage waveform F in the interval between each key pulse and after each positive pulse in the sample pulse waveform E. The opposite phase output of the voltage comparator COMP6 provides a pulse voltage waveform K which is at a more positive voltage level when the tachogenerator output voltage D is between the voltage levels V1 and V4 and is at a less positive voltage level when the tachogenerator is outside the voltage levels V1 and V4. The waveform K is provided as an input to the start-up circuit 8 and its effect will be described in more detail later.

The response of the system to noise on the tachogenerator output voltage waveform D, and in particular the degree of immunity to such noise provided by the arrangement and operation of the key pulse producing means G1 will now be explained with particular reference to FIG. 8 which shows six examples of noise pulses N1 to N6 on the waveform D. FIG. 8 also shows the effect of these noise pulses on the voltage waveform F which is the Q output of the master bistable circuit 9 shown in FIG. 7, on a voltage waveform L which is the Q output of the slave bistable circuit 10 shown in FIG. 7, on the sample pulse voltage waveform E which is the output of the AND gate G3 shown in FIG. 1, on the reset pulse voltage waveform G which is the output of the AND gate G2 shown in FIG. 1, and on the voltage $V_T$ which is the output of the voltage generator 6 shown in FIG. 1 and responsive to the waveforms F, E and G. The dotted outline waveform above the voltage $V_T$ shows what the voltage $V_T$ would be in response to the waveform D in the absence of the noise pulses N1 to N6.

The effects of the noise pulses N1 and N2 will first be described, since these illustrate the worst case effects of noise pulses which do cross both the voltage levels V2 and V3.

Assuming that a key pulse in the waveform F starts at a correct time t1 when the waveform D goes above the voltage level V2 then the voltage $V_T$ will begin to ramp up. If a negative noise pulse N1 then occurs during the same positive half cycle of the waveform D when it is above the voltage level V1 and crosses both voltage levels V2 and V3 then the effect will be as follows. The falling edge of the pulse N1 will clock the slave bistable circuit 10, waveform L, and therefore the succeeding rising edge of the pulse N1 will clock the master bistable circuit 9 at the time t2 stopping the ramp up of the voltage $V_T$ at an erroneous low level which is gated to the comparator COMP2 by a positive sample pulse on the waveform E. However, the voltage $V_T$ will be reset when the waveform D next goes below the voltage level V3 and at the time t3 a key pulse will commence and ramp the voltage $V_T$ up to its correct level. Thus the system recovers its correct operation within one period of the tachogenerator output waveform D. Furthermore the value of the reference capacitor $C_R$ is chosen such that the reference voltage $V_R$ can only change by a small amount during each comparison in the comparator COMP2 with the voltage $V_T$. Thus the effect of a single error voltage $V_T$ is very small.

Assuming that a key pulse in the waveform F stops at a correct time t4 when the waveform D goes above the voltage level V2 then the correct voltage level $V_T$ will have been reached. If, after that correct voltage $V_T$ has been sampled, a positive noise pulse N2 occurs during the following negative half cycle of the waveform D when it is between the voltage levels V3 and V4 and this noise pulse N2 crosses both voltage levels V3 and V2 then the effect will be as follows. The rising edge of the pulse N2 will clock the master bistable circuit 9 at the time t5. Thus a reset pulse is lost and a premature key pulse ramps up the voltage $V_T$ until the time t6 to an erroneous high level which is then gated to the comparator COMP2 by the waveform E. However, the voltage $V_T$ will be reset when the waveform D next goes below the voltage level V3 and at the time t7 a key pulse will commence and ramp the voltage $V_T$ up to its correct level. Thus the system recovers its correct operation within two periods of the tachogenerator output waveform D, and the effect of a single error voltage $V_T$ is very small as has been explained with reference to the noise pulse N1.

Assuming again that a key pulse commences at the time t7 and the voltage $V_T$ commences to ramp up, then if a negative noise pulse N3 occurs during the same positive half cycle of the waveform D when it is above the voltage level V1 and crosses the voltage level V2 but not the voltage level V3 there is no effect. This is because the falling edge of the noise pulse N3 does not provide a clock input to change the state of the slave bistable circuit 10 and so the clock input to the master bistable circuit 9 provided by the rising edge of the noise pulse N3 does not change its state.

If a positive noise pulse N4 occurs during the following negative half cycle of the waveform D when it is below the voltage level V4 and crosses the voltage level V3 but not the voltage level V2 there is again no effect. This is because the rising edge of the noise pulse N4 does not provide a clock input to change the state of the master bistable circuit 9 and so the clock input to the slave bistable circuit 10 provided by the falling edge of the noise pulse N4 does not change its state.

A negative noise pulse N5 which occurs during the higher voltage level of the waveform H (see FIG. 6) during the interval between key pulses and only crosses the voltage level V1 will interrupt the positive sample pulse E. The adjustment of the reference voltage $V_R$ to the voltage $V_T$ by the comparator COMP2 will be interrupted for the duration of the noise pulse N5. As has been previously mentioned, the capacitor $C_R$ is chosen such that the reference voltage $V_R$ can only change by a small amount during each comparison in the comparator COMP2 with the voltage $V_T$. Thus the effect of the noise pulse N5 is very small.

A positive noise pulse N6 which occurs during the higher voltage level of the waveform J (see FIG. 6) during the interval between key pulses and only crosses the voltage level V4 will interrupt the positive reset pulse G for the duration of the noise pulse N6. However, as has been previously mentioned, the rate of discharge of the ramp capacitor $C_T$ is arranged such that the voltage $V_T$ will come back to the negative voltage rail $-V$ during the shortest possible full reset period provided by the reset pulse waveform G from the most positive possible level of the voltage $V_T$. Thus the effect of the noise pulse N6 will at the most be very small.

The start-up circuit 8 will now be described in more detail with reference to FIGS. 1, 9 and 10. The start-up circuit 8 includes two current sources I4 and I5, each of which may be realised as shown in FIG. 5B. The current source I4 is connected between the positive voltage rail OV and one side of a resistor R5. The other side of the resistor R5 is connected to the ramp capacitor $C_T$ and to one input of a NAND gate G5. The output voltage waveform K of the voltage comparator COMP6 is connected via an inverter G4 to the gate of the current source I4 and directly to the other input of the NAND gate G5. The output of the NAND gate G5 is connected to the gate of the current source I5 which is connected between the positive voltage rail OV and the reference capacitor $C_R$.

FIG. 10 shows that at a time t0 shortly after power is turned on, the motor 1 is at rest and so the output waveform D of the tachogenerator 5 is at zero volts. The output waveform K of the voltage comparator COMP6 is thus at its more positive level appropriate to the waveform D being between the voltage levels V1 and V4. The master bistable circuit 9 and the slave bistable circuit 10 of the key pulse producing means G1 are in a random condition; and for the sake of example their output waveforms F and L are shown with F at its more positive voltage level (i.e. no key pulse) and with L at its less positive voltage level. The sample and reset waveforms E and G will be at their less positive voltage levels. The ramp capacitor $C_T$ is arranged such that its voltage $V_T$ is that of the negative voltage rail $-V$. The waveform B will be produced by the ramp waveform generator 4 from the AC supply, but the voltage $V_R$ of the reference capacitor $C_R$ will be that of the negative voltage rail $-V$, i.e. at a level more negative than the most negative value reached by the waveform B. The output waveform A of the voltage comparator COMP1 will thus not turn on the triac 3 and no power will be supplied to the motor 1. Although the waveform K is at its upper voltage level, the voltage $V_T$ is so low that the NAND gate G5 will not be turned on and so its voltage output waveform P will be at a more positive voltage level which will not gate on the current source I5 to the reference capacitor $C_R$. The waveform K, inverted by the inverter G4 will, however, turn on the current source I4 which will supply a current at a value determined by the resistor R5 to the capacitor $C_T$ and so the voltage $V_T$ will begin to rise. If the random state of the master bistable circuit 9 had been such as to provide a key pulse to turn on the current source I3, this would have increased the current supplied to the capacitor $C_T$ and hence the rate of increase of the voltage $V_T$.

At a time t1, the voltage $V_T$ will reach a value, above that appropriate to any of the desired speeds of the motor, at which the NAND gate G5 will be turned on and the current source I5 will provide a charging current to the capacitor $C_R$ to raise the voltage level $V_R$. The voltage $V_T$ then remains at a maximum value. At a time t2 the waveform B will go below the voltage $V_R$ and so pulses in the waveform A will commence, turning on the triac 3 for a period during each half cycle of the AC supply and thereby providing power to the motor 1. At a time t3 the motor 1 starts rotating and the waveform D commences at a low voltage and low frequency. The voltage $V_R$ will continue to rise thereby increasing the amount of power supplied to the motor 1 and hence its speed and hence the voltage amplitude and frequency of the waveform D. At a time t4 the waveform D will cross the voltage level V2 for the first time but, since the Q output of the slave bistable circuit 10 is low, the state of the master bistable circuit 9 will not change. At a time t5 the waveform D will cross the voltage level V3 for the first time and clock the slave bistable circuit 10, and so the next time the waveform D crosses the voltage level V2 the master bistable circuit 9 will change state. The key pulse producing means G1 will then be operating correctly.

At a time t4 the waveform D will cross the voltage level V1 for the first time. While the waveform D is above the voltage level V1, the waveform K will go to a lower voltage level, the NAND gate G5 will temporarily turn off the current source I5 and the voltage $V_R$ will be temporarily constant. However, when the waveform D first goes above the voltage level V1 in the interval between key pulses at a time t7, a positive sample pulse will appear in the waveform E and the voltage $V_R$ will be raised as a result of a comparison with the voltage $V_T$ in the gated on voltage comparator COMP2.

At a time t8 the waveform D will cross the voltage level V4 for the first time in the interval between key pulses. A positive reset pulse will appear in the waveform G, the capacitor $C_T$ will be discharged and the voltage $V_T$ will go down to the negative rail $-V$. The NAND gate G5 will turn off and will turn off the current source I5. The voltage $V_R$ will then remain constant until it is lowered at a time t9 as a result of a comparison with the voltage $V_T$ in the gated on voltage comparator COMP2. The voltage $V_T$ in that first comparison after the first reset pulse G will depend on the setting of the speed selection resistor $R_S$ and the duration of the preceeding key pulse. The motor will be at a lower speed than is selected and so the voltage $V_T$ at the end of the key pulse will be higher than that appropriate to the selected speed. However, the voltage $V_T$ will be lower than the voltage $V_R$ at that time, resulting in a lowering of $V_R$ during the comparison by the voltage comparator COMP2. The voltage $V_T$ will also be lower than that required to turn on the NAND gate G5 and so the start-up circuit 8 will cease to be effective.

As the speed of the motor increases, the voltage $V_T$ reached at the end of each key pulse will decrease and the voltage $V_R$ will be lowered during the succeeding sample pulse E until they both stabilise at a value appropriate to the selected speed.

Some possible modifications within the scope of the invention of the detailed embodiment described above with reference to FIGS. 1 to 10 are as follows. An a.c. series wound electric motor controlled by a triac has been described, the triac being turned on for a period during every half cycle of the ac supply by comparing a ramp waveform with a reference voltage $V_R$. However, the reference voltage $V_R$ may be used in other ways, for example to charge a further capacitor; so as to turn on either the triac or a different solid state controlled switch, for example a thyristor; either in each half cycle or every other half cycle, for example in half-wave rectified operation of a d.c. electric motor; the electric motor being d.c. or a.c. and series wound or shunt wound.

The output voltage $V_T$ of the voltage generator 6 has been described as being compared with a reference voltage $V_R$ on a capacitor $C_R$, the result of the comparison being used to charge or discharge the capacitor $C_R$ to modify the reference voltage $V_R$. A reference voltage can be derived in other ways, for example it can be the voltage at the control electrode of a transistor, and modified in other ways by comparison with the voltage $V_T$.

The circuit for processing the a.c. output of the tachogenerator, comprising the voltage level detection means 7, the key pulse producing means G1, the gates G2 and G3 and the voltage generator 6 has been described as incorporated in the feedback system of an electric motor speed control circuit. The output of the voltage generator 6 could, however, be used for other purposes where speed measurement by means of a tachogenerator is required. Within this circuit the key pulse waveform F and the reset pulse waveform G supplied to the voltage generator circuit 6 are essential to produce the voltage $V_T$. The sample pulse waveform E which is also produced is useful in the particular application of the voltage $V_T$ to the motor speed control circuit described, and it may also be useful in other applications.

The particular form of the key pulse producing means G1, which is driven by two clock inputs derived from two separate voltage levels of the tachogenerator output, is particularly advantageous in providing a degree of noise immunity as has been described. However, a key pulse waveform with the duration of each key pulse being inversely proportional to the rotational speed can be produced by a different form of key pulse producing means, for example by a divide-by-two circuit responsive to zero crossing pulses derived from the tachogenerator output.

What we claim is:

1. A circuit for processing the a.c. output signal of a tachogenerator whose frequency is proportional to the speed of the tachogenerator rotor comprising, voltage level detection means responsive to said a.c. output signal, key pulse producing means responsive to at least one output of the detection means to produce a key pulse in alternate cyclic periods of the a.c. output signal, the duration of said key pulse being inversely proportional to the rotational speed, first gating means responsive to a second output of the detection means and to an output of the key pulse producing means to produce a reset pulse after a predetermined period in the interval between each key pulse, and a voltage generator responsive to each reset pulse to provide a predetermined output level and responsive to each key pulse to ramp that output level at a predetermined rate for the duration of said key pulse, whereby the output level of the voltage generator during each said predetermined period is a predetermined function of the tachogenerator rotational speed.

2. A circuit as claimed in claim 1 wherein the detection means is responsive to first and second voltage levels of said a.c. signal which are of opposite polarity to provide corresponding first and second outputs, and in which the key pulse producing means comprises a JK flip-flop including a master bistable circuit which is clocked by said one output of the detection means and a slave bistable circuit which is clocked by a third output of the detection means.

3. A circuit for controlling the speed of an electric motor coupled to a tachogenerator which provides an a.c. output signal whose frequency is proportional to the rotational speed comprising, a controlled solid state switch for connection in series with the motor such that a power pulse is supplied to the motor while the switch is turned on, means for providing a reference voltage so that the proportion of time for which the switch is turned on is dependent on said reference voltage, and feedback means coupled to the tachogenerator and which includes a circuit as claimed in claim 1 and means for modifying said reference voltage according to the output level of the voltage generator during each said predetermined period.

4. A circuit as claimed in claim 3 further comprising second gating means responsive to a further output of the detection means and an output of the key pulse producing means to produce a sample pulse during each said predetermined period, in which the means for providing a reference voltage comprises a capacitor, and said voltage modifying means comprises comparison means responsive to each sample pulse to make a comparison of the output level of the voltage generator with the reference voltage and responsive to a difference between the compared voltages to provide a current of appropriate sense to the capacitor to modify the reference voltage.

5. A circuit as claimed in claim 3 wherein said voltage generator comprises, a capacitor which is charged for the duration of each key pulse by a current having a value corresponding to said predetermined rate, and motor speed selection means including means to determine the value of the capacitor charging current during each key pulse.

6. A circuit as claimed in claim 4 wherein said voltage generator comprises, a second capacitor charged for the duration of each key pulse by a current of a value corresponding to said predetermined rate, and a motor speed selector including means for determining the value of the second capacitor charge current during a key pulse.

7. A circuit for processing a cyclic A.C. signal comprising, voltage level detection means coupled to receive the A.C. signal and responsive thereto to produce at first and second outputs thereof first and second control signals determined by first and second voltage levels of the A.C. signal, key pulse producing means coupled to said first output to produce a key pulse in alternate cyclic periods of the A.C. signal such that the pulse duration of said key pulse is determined by the frequency of the A.C. signal, first gating means coupled to said second output and to an output of the key pulse producing means to produce a reset pulse in the interval between successive key pulses and after a predetermined time period, and a voltage generator coupled to said first gating means and to said key pulse producing means and responsive to a reset pulse to generate a first signal output level and responsive to a key pulse to produce a ramp signal at a predetermined rate for the duration of the key pulse whereby the output level of the voltage generator during said predetermined time period is determined by the A.C. signal frequency.

8. A circuit as claimed in claim 7 wherein said first and second voltage levels of the A.C. signal are of opposite polarity, and wherein said voltage level detection means comprises first and second comparison devices having first inputs coupled to receive the A.C. signal and second inputs respectively coupled to first and second voltage sources which supply said first and second voltage levels, respectively.

9. A circuit as claimed in claim 7 wherein said voltage generator comprises, a capacitor, a current source coupled to the capacitor and gated on by said key pulse to provide a charge current for the capacitor for the duration of the key pulse, and means responsive to said reset pulse for discharging the capacitor to said first signal output level.

10. A circuit as claimed in claim 7 wherein said voltage level detection means includes a third output at which it produces a third control signal determined by a third voltage level of the A.C. signal and said circuit further comprises second gating means coupled to said third output and to said output of the key pulse producing means to produce a sample pulse in the interval between successive key pulses and prior to said reset pulse.

11. A speed control circuit for an electric motor wherein a tachogenerator provides an A.C. output signal whose frequency is proportional to motor speed, said control circuit comprising, a controlled semiconductor switch for coupling the motor to a source of drive power, a source of reference voltage which determines the on-off periods of the controlled switch, feedback means coupled to the tachogenerator output and comprising a circuit as claimed in claim 7, and means coupled to the output of said voltage generator for modifying said reference voltage as a function of the voltage generator output signal occurring during said predetermined time period.

12. A speed control circuit as claimed in claim 11 wherein said feedback means further comprises second gating means coupled to said output of the key pulse producing means and to a third output of the voltage level detection means at which a third control signal appears which is determined by a third voltage level of the A.C. signal, said second gating means being responsive to produce a sample pulse in the interval between successive key pulses and prior to said reset pulse.

13. A speed control circuit as claimed in claim 12 further comprising a comparison device with first and second inputs coupled to said source of reference voltage and to the output of the voltage generator and a gate control input coupled to the output of the second gating means whereby the comparison device is activated only during the occurrence of the sample pulse.

* * * * *